United States Patent
Togwe et al.

(10) Patent No.: US 10,762,895 B2
(45) Date of Patent: Sep. 1, 2020

(54) LINGUISTIC PROFILING FOR DIGITAL CUSTOMIZATION AND PERSONALIZATION

(71) Applicant: International Business Machines Corporation, Armonk, NY (US)

(72) Inventors: Thembani Togwe, Lenexa, KS (US); Yael Ravin, Mount Kisco, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/638,750

(22) Filed: Jun. 30, 2017

(65) Prior Publication Data

US 2019/0005949 A1    Jan. 3, 2019

(51) Int. Cl.
| | | |
|---|---|---|
| G06F 17/27 | (2006.01) | |
| G06F 17/21 | (2006.01) | |
| G10L 15/18 | (2013.01) | |
| G10L 15/22 | (2006.01) | |
| G10L 17/26 | (2013.01) | |
| G10L 15/26 | (2006.01) | |
| G06F 40/20 | (2020.01) | |

(52) U.S. Cl.
CPC .......... *G10L 15/1822* (2013.01); *G06F 40/20* (2020.01); *G10L 15/22* (2013.01); *G10L 15/26* (2013.01); *G10L 17/26* (2013.01); *G10L 2015/226* (2013.01)

(58) Field of Classification Search
CPC .......... G06F 17/30598; G06Q 30/0271; G06Q 30/0277; H04N 21/25883
See application file for complete search history.

(56) References Cited

U.S. PATENT DOCUMENTS

| | | | |
|---|---|---|---|
| 7,359,894 B1* | 4/2008 | Liebman | G06Q 10/107 |
| 7,775,159 B2 | 8/2010 | Krauser et al. | |
| 7,818,290 B2 | 10/2010 | Davis et al. | |
| 8,255,948 B1 | 8/2012 | Black et al. | |
| 8,312,029 B2 | 11/2012 | Snell | |
| 8,972,400 B1* | 3/2015 | Kapczynski | G06Q 10/06 |
| | | | 707/732 |
| 9,336,192 B1 | 5/2016 | Barba et al. | |
| 9,412,358 B2 | 8/2016 | Mishra et al. | |
| 9,431,003 B1 | 8/2016 | Cecchi et al. | |
| 9,564,123 B1* | 2/2017 | Mont-Reynaud | H04L 67/306 |
| 9,631,353 B1 | 4/2017 | Walker | |
| 9,786,281 B1* | 10/2017 | Adams | G10L 15/265 |
| 10,021,061 B1* | 7/2018 | Bastide | G06F 40/106 |

(Continued)

OTHER PUBLICATIONS

Mel, et al. "The NIST Definition of Cloud Computing". Recommendations of the National Institute of Standards and Technology. Nov. 16, 2015.

(Continued)

*Primary Examiner* — Olujimi A Adesanya (74) *Attorney, Agent, or Firm* — Samuel Waldbaum, Esq.; McGinn IP Law Group, PLLC (57) ABSTRACT

A linguistic profiling method, system, and computer program product include capturing a language input of an individual user, analyzing the language input to detect an attribute of the language input, and synthesizing the attribute to characterize a feature of the individual user.

16 Claims, 5 Drawing Sheets

(56) References Cited

U.S. PATENT DOCUMENTS

| | | | | |
|---|---|---|---|---|
| 2004/0210661 | A1* | 10/2004 | Thompson | G06Q 30/02 709/228 |
| 2007/0150426 | A1* | 6/2007 | Asher | G06K 9/6272 706/20 |
| 2010/0114562 | A1 | 5/2010 | Hutchinson et al. | |
| 2010/0125502 | A1 | 5/2010 | Solomon et al. | |
| 2011/0166939 | A1* | 7/2011 | Junkin | G06Q 30/02 705/14.61 |
| 2012/0089605 | A1* | 4/2012 | Bangalore | G06F 17/30976 707/737 |
| 2013/0030919 | A1 | 1/2013 | Brinson, Jr. et al. | |
| 2013/0103624 | A1* | 4/2013 | Thieberger | G06Q 10/063 706/12 |
| 2013/0124298 | A1* | 5/2013 | Li | G06O 30/0241 705/14.42 |
| 2013/0191394 | A1* | 7/2013 | Bradley | G06Q 10/10 707/738 |
| 2013/0311395 | A1* | 11/2013 | Bohra | G06Q 30/00 705/347 |
| 2014/0207518 | A1* | 7/2014 | Kannan | G06Q 30/0201 705/7.29 |
| 2014/0274022 | A1 | 9/2014 | Bell et al. | |
| 2015/0070516 | A1* | 3/2015 | Shoemake | H04N 21/42203 348/207.11 |
| 2015/0127343 | A1* | 5/2015 | Mullor | G10L 17/26 704/244 |
| 2015/0154002 | A1* | 6/2015 | Weinstein | G06F 3/167 715/728 |
| 2015/0269627 | A1* | 9/2015 | Urdiales | G06Q 30/02 705/14.66 |
| 2016/0188673 | A1* | 6/2016 | Maughan | G06F 17/30528 707/733 |
| 2016/0196490 | A1 | 7/2016 | Chandrasekaran et al. | |
| 2016/0253710 | A1 | 9/2016 | Publicover et al. | |
| 2017/0024455 | A1* | 1/2017 | Powell | G06F 16/285 |
| 2018/0005161 | A1* | 1/2018 | Cong | G06Q 10/06393 |
| 2018/0061421 | A1* | 3/2018 | Sarikaya | G10L 17/06 |

OTHER PUBLICATIONS

Koppel, M., Schler, J., & Zigdon, K. (2005). "Determining an author's native language by mining a text for errors". Proceedings of the eleventh ACM SIGKDD international conference on Knowledge discovery in data mining, 624-628.

Leemann, A. Kolly, M. J., Dellwo, V. et al. "Data elicitation 2.0: crowdsourcing areal and speaker variation". Department of Comparative Linguistics, University of Zurich, Department of Linguistics, University of Geneva iBros LTD.

Goldman, J. P., Leemann, A., Kolly, M. J. et al. (2014). "A Crowdsourcing Smartphone Application for Swiss German: Putting Language Documentation in the Hands of the Users", Research Track Poster, LREC, 3444-3447.

O'Connor, B., Eisenstein, J., Xing, E. P. et al. (2010). "Discovering demographic language variation". School of Computer Science Carnegie Mellon University Pittsburgh, PA 15215, USA,. Brenocon,jacabeid,epxing,nasmith@e.emu.edu.

Volkova, S., Wilson, T., & Yarowsky, D. (2013). "Exploring Demographic Language Variations to Improve Multilingual Sentiment Analysis in Social Media", Center for Language and Speech Processing, Johns Hopkins Unviserssity, Human-Language technology Center of Excellence, EMNLP, 1815-1827.

* cited by examiner

LINGUISTIC PROFILING FOR DIGITAL CUSTOMIZATION AND PERSONALIZATION

BACKGROUND

The present invention relates generally to a linguistic profiling method applicable to a cloud computing environment, and more particularly, but not by way of limitation, to a system, method, and computer program product for linguistic profiling to improve digital customization and personalization.

Conventionally, linguistic profiling methods may use known demographic information about a user and then look at text inputs of the user to analyze the style, and then associate the two pieces of information (i.e., match the user's demographic to the style). However, these conventional techniques rely on pre-established demographics and sometimes are restricted to pre-established demographic groups.

SUMMARY

In an exemplary embodiment, the present invention can provide a computer-implemented linguistic profiling method, the method including a computer-implemented linguistic profiling method, the method including capturing a language input of an individual user, analyzing the language input to detect an attribute of the language input, and synthesizing the attribute to characterize a feature of the individual user. One or more other exemplary embodiments include a computer program product and a system, based on the method described above.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways that should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

The invention will now be described with reference to FIGS. 1-5, in which like reference numerals refer to like parts throughout. It is emphasized that, according to common practice, the various features of the drawings are not necessarily to scale. On the contrary, the dimensions of the various features can be arbitrarily expanded or reduced for clarity.

Figure 2:
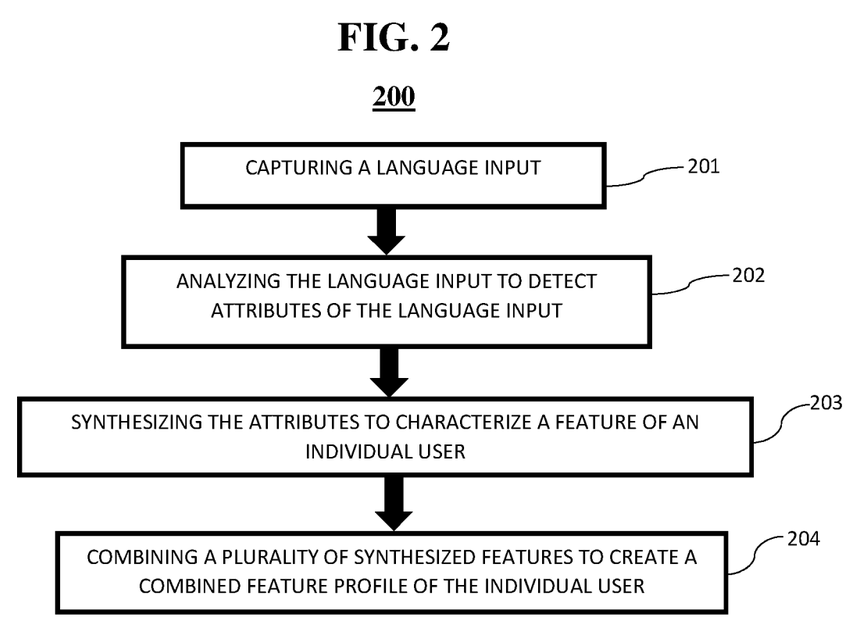
FIG. 2 exemplarily shows a high-level flow chart for a linguistic profiling method 200 according to an embodiment of the present invention.

By way of introduction of the example depicted in FIG. 2, an embodiment of a linguistic profiling method 200 according to the present invention can include various steps for ranking phrases in a corpus by boosting the rank of phrases containing words that appear frequently in other phrases, or that smooths out ranking differences between such phrases.

Figure 3:
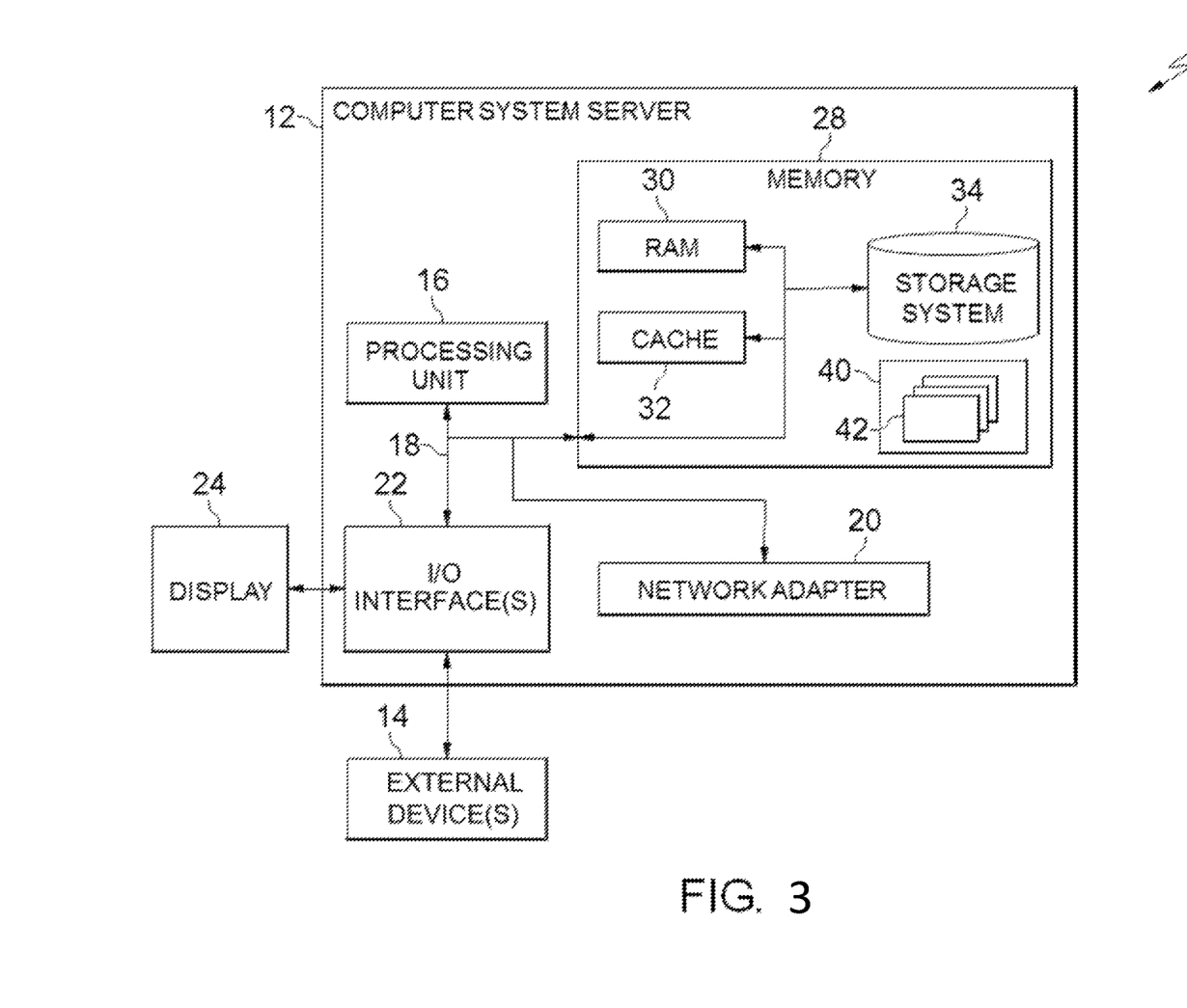
FIG. 3 depicts a cloud-computing node 10 according to an embodiment of the present invention.

By way of introduction of the example depicted in FIG. 3, one or more computers of a computer system 12 according to an embodiment of the present invention can include a memory 28 having instructions stored in a storage system to perform the steps of FIG. 2.

Figure 1:
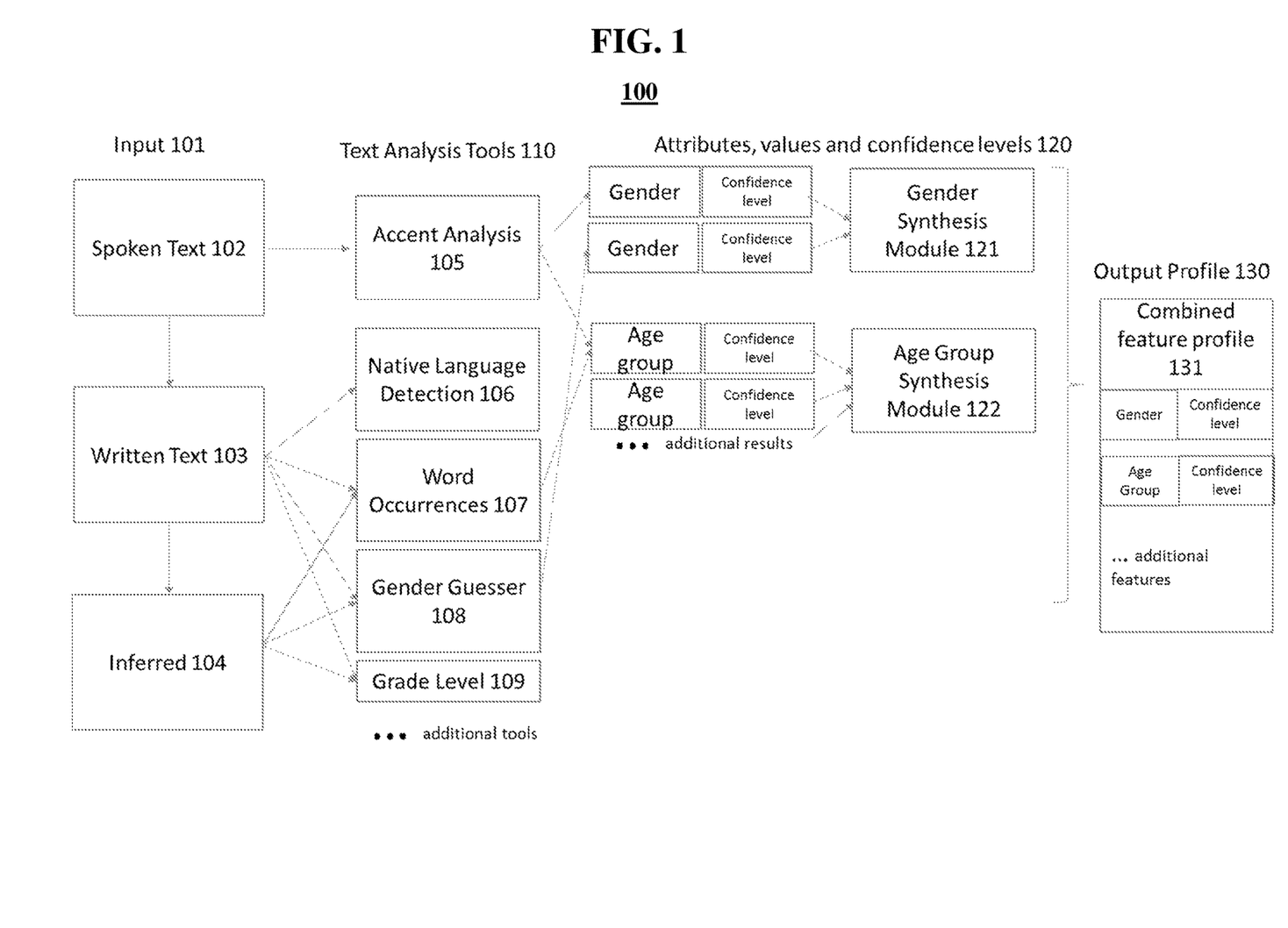
FIG. 1 exemplarily shows a high-level system 100 according to an embodiment of the present invention.

With reference now to FIGS. 1-2, in step 201, a language input 101 is captured. That is, a language input including any of spoken text 102, written text 103, and/or inferred inputs 104 (i.e., expressions, nuance, etc. of a user) are input from a single individual and is captured by the system 100. Although spoken text 102, written text 103, and inferred inputs 104 are detailed, the invention is not limited thereto. Further, such inputs may be used singly or in combination.

In step 202, the language input 101 is analyzed (i.e., by one of a text analysis tool(s) 110) to detect attributes of the language input. For example, if the language input is spoken text 102 (e.g., recorded or streamed real-time) it is sent to one (or more) accent analysis components (i.e., accent analysis 105), which outputs probable values for a set of attributes, each associated with a confidence level. The spoken text is then converted into written text using a speech-to-text tool, so that it can be analyzed by the system's components that analyze written text. That is, written text 103 or inferred inputs 104 from a single individual is sent to several text analysis tools of which output values for a set of attributes, each associated with a confidence level. For example, the native language detection tool 106 can detect in which language the text is written (i.e., French, English, Mandarin, etc.), word occurrences 107 can be used to detect attributes derived from a user's choice of words, gender features can be extracted from the input, a grade level of the user can be extracted, etc.

In other words, in step 202, various text analysis tools and techniques (e.g., such as language detection tools, grammar and style checkers, spell checkers, accent detection tools, sentiment analysis, gender guessing tools, readability-level tools, etc.) are utilized to profile the spoken, written, and/or inferred language inputs of individuals and extract a set of attributes that characterize these individuals.

In step 203, the attributes detected in step 202 are synthesized to characterize a feature (or a plurality of features) of the user. A feature can include, for example, gender, age, ethnicity, race, native language, national affiliation, regional affiliation, level of education, spending history, world view of the user, religion, type of profession or employment position, etc. That is, a synthesis module (i.e., gender synthesis module 121, age group synthesis module 122) combines the different values for each attribute 120, based on their confidence levels. This module can be made more accurate with manual adjustment of weights assigned to the various analysis tools, or it can be designed to learn automatically—i.e., adjust its weights based on training.

For example, based on the spoken text 102, a first gender attribute and a confidence level are detected, based on the written text 103, a second gender attribute and a confidence level are detected, and based on the inferred language input 104, a third gender attribute and a confidence level are detected. Each of the first, second, and third gender attributes is synthesized to characterize a feature of the user (i.e., the gender). Similarly, based on spoken text 102 (i.e., I just purchased a pair of brand X shoes), a first spending history attribute and confidence level are detected, and based on a written text 103 (i.e., an e-mail receipt of a purchase of a pair of brand X shoes), a second spending history attribute and confidence level are detected. The first and second spending history attributes are synthesized to character a feature of the user (i.e., a spending history feature to help advertise to the user). Generally, it is believed that more (and varied kind) of inputs will result in a greater accuracy of characterization of the feature(s).

In step 204, a combined profile of the user is created by combining a plurality of the synthesized features of the user (or at least one feature). Thus, the output profile 130 includes the combined feature profile of the user 131, which is a profile of each of the features of the user deducted from the attributes from the language input. Therefore, each combined feature profile is uniquely associated with a user (i.e., one-to-one basis). The output profile 130 includes a feature profile of an individual (i.e., a set of "individualized demographic" attributes with values. These attributes can be changed to suit the need.

Therefore, each profile only represents one user. Thereby, steps 201-204 can provide a 'crowdsourced' approach to compiling attributes based on text analysis that takes advantage of the growing number of attribute analysis techniques, a set of discreet features (i.e., a combined feature profile) that allows the consuming application or service maximum flexibility (e.g., offer a set of products to a subset of the population for which it is deemed to be relevant), enables easy usability such as new text analysis modules can be very easily plugged into the system, to provide values to existing attributes, or to add new attributes. Also, as the feature groups are not pre-defined, the consuming application or service has maximum flexibility such as to ignore certain attributes, to rank certain attributes higher (or lower) than others, combine them into groupings that make sense for a particular context, etc. (i.e., create a completely new feature group based on a product).

Referring generally to FIG. 1, attributes are not preset and can be expanded using the same core crowdsourcing technique for each attribute. For example, a native language attribute of the language input can be detected using machine learning techniques based on errors and other characteristics, an age group attribute can be detected by a tone analyzer of which over occurrence/usage of certain words may be tied to an era, a gender attribute can be detected by pronoun frequency (i.e., first-person, second-person and third-person; determiners or specifiers usage), etc. or average number of disfluencies per sentence from the speaker or writer, average number of person name addressing per sentence from the speaker, syntactic parse first-best likelihood scores, regional affinity can be detected by relationship extraction which decomposes sentences into various components which can be used to detect structure and relate to native languages, a grade level attribute can be detected by, for example, Flesch-Kincaid readability tests, and beliefs, political leanings or other world views can be detected by analyzing the language input.

In one exemplary embodiment, attributes can be detected and synthesized to create a world view profile to characterize a feature of a user. For example, media sources can have the written text 103 input into the system 100 of which a world view profile 131 for each reporter can be synthesized to allow the readers to know of any world view within the media source. That is, each individual reporter of a media source (e.g., newspaper, television, etc.) can have each of his or her articles analyzed to create an individual feature profile (i.e., world view profile) for the reporter. Then, the plurality of feature profiles for the entire media source can be combined, for example, to generate a report for the world view of the entire media source.

Therefore, steps 201-204 can provide a linguistic profiling technique to profile individual users based on any known or newly-created feature. That is, the method 200 can use various text analysis tools and techniques (e.g., such as language detection tools, grammar and style checkers, spell checkers, accent detection tools, sentiment analysis, gender guessing tools, readability-level tools, etc.) to profile the spoken, inferred, and written texts of individuals and extract a set of attributes that characterize features of these individuals. The tools and techniques work in parallel in that they each take the text (e.g., written or spoken) as input and provide one or more attributes as output, with a certain level of accuracy. The outputs include one or more attributes, one or more values associated with the attribute, and a confidence level. The attributes, as discussed above, can include age group, gender, ethnicity (or race), native language, national affiliation, regional affiliation, level of education, socio economic status (for example income level), family structure, world view, religion, political leanings, type of profession or employment, personality traits, etc. The steps 201-204 synthesizes the attributes to characterize a feature of the individual.

As a result, and because the combined feature profile includes an individual profile of a user, the data is highly customizable for a user of the system. Thus, embodiments of the profiling system and method may provide information to target advertising, greater customer intimacy and target offers. Additionally, embodiments of the invention may also be beneficially used for intelligence security profiling and in language learning.

Recognizing that people with different native languages speak or write English in a different way and sometimes those word choices and arrangements help determine their national or regional affiliation. For example, people whose native language is not English, may make some grammatical mistakes in their written or spoken English. Sometimes these arrangements are not mistakes—but rather unusual arrangements or word usage choices which when written could amount to the text equivalent of an accent. Embodiments of the invention may test for these differences and categorize accordingly.

Also, because the features are not pre-set, a user of the system may customize which attributes that they would like to characterize features based on.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of distributed computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 3, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or more program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
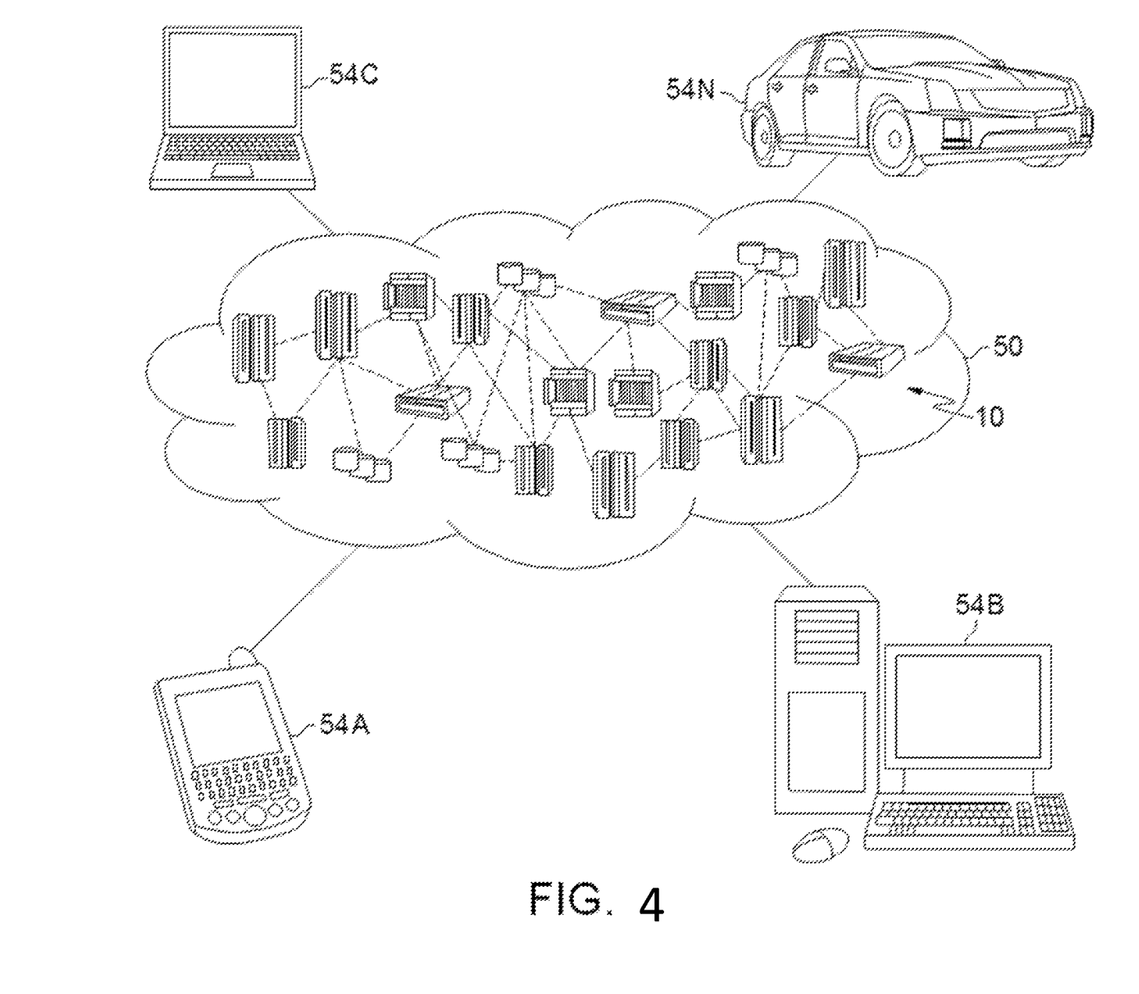
FIG. 4 depicts a cloud-computing environment 50 according to an embodiment of the present invention.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
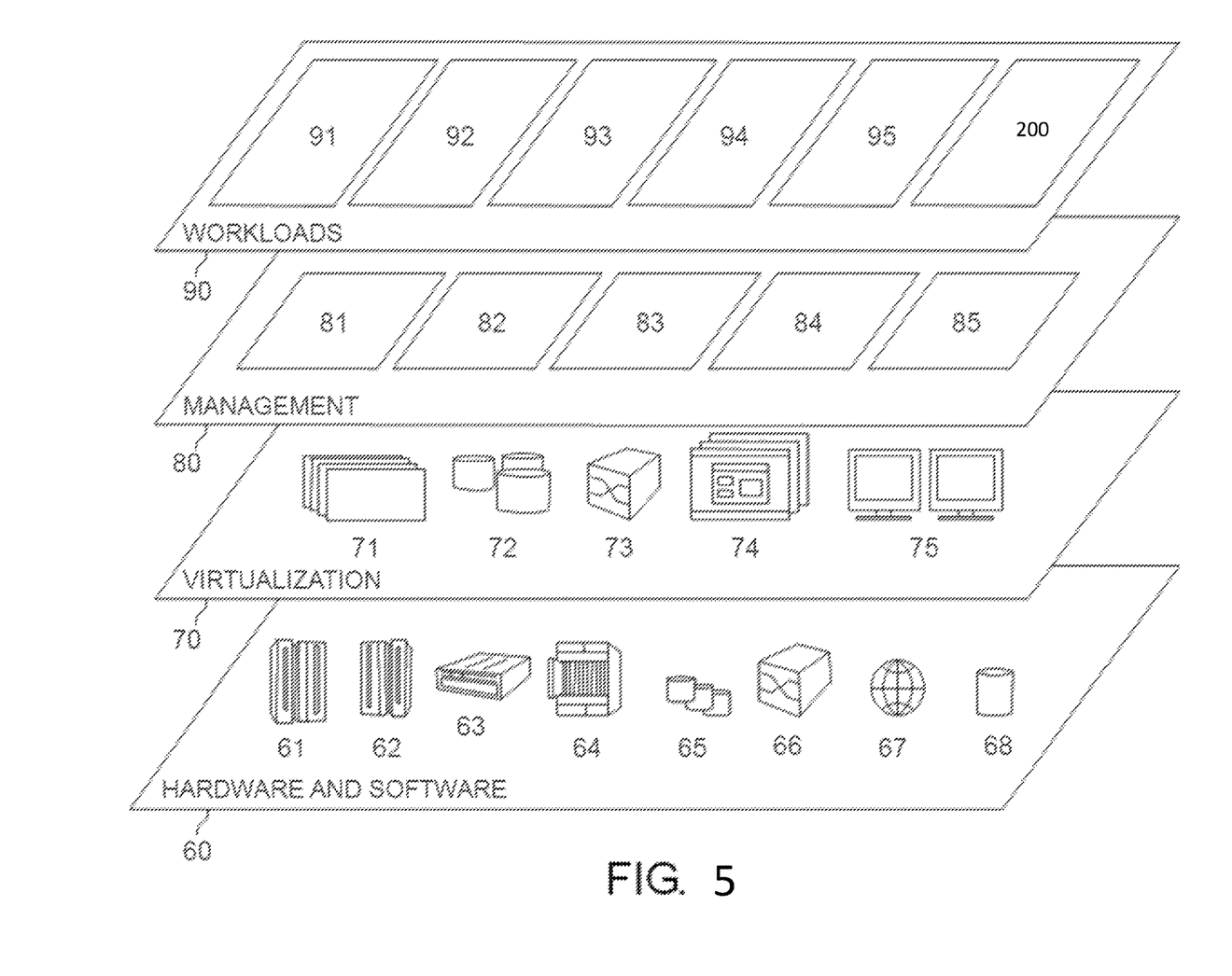
FIG. 5 depicts abstraction model layers according to an embodiment of the present invention.

Referring now to FIG. 5, an exemplary set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and linguistic profiling method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), a Storage Area Network (SAN), a Network Attached Storage (NAS) device, a Redundant Array of Independent Discs (RAID), an erasable programmable read-only memory (EPROM or Flash memory), a static random access memory (SRAM), a portable compact disc read-only memory (CD-ROM), a digital versatile disk (DVD), a memory stick, a USB "thumb" drive, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented linguistic profiling method, the method comprising:
    capturing a language input of an individual user;
    analyzing the language input to detect an attribute of the language input by using a machine learning technique based on errors and a gender attribute that is detected by pronoun frequency;
    synthesizing the attribute to characterize a feature of the individual user; and
    combining a plurality of synthesized features to create a combined feature profile of the individual user as a one-to-one profile for only the individual user,
    wherein the attribute and the feature are dynamically detected and are not pre-set via the analyzing and synthesizing,
    wherein a crowdsourced approach is utilized for compiling a plurality of new demographic attributes based on a text analysis of the language input of the individual user and the plurality of synthesized features,
    wherein a group view profile is created from a plurality of combined feature profiles aggregated from linked individual users to categorize a group of individuals,
    wherein a media source comprises the group of individuals,
    the method further comprising:
        outputting the combined feature profile to a third-party application;
        outputting the group view profile to a third-party application to generate a report for a group view of the linked individual users; and
        identifying a world view within the media source,
    wherein the analyzing includes at least two analysis techniques that work in parallel to each output the attribute with a confidence level to the synthesizing, and
    wherein the synthesizing characterizes the attribute to the feature based on the confidence level.

2. The computer-implemented method of claim 1, wherein the language input is selected from a group consisting of:
    spoken text;
    sign language;
    written text; and
    inferred speech.

3. The computer-implemented method of claim 1, wherein the attribute is based on an individual, user-specific identifying feature of the user.

4. The computer-implemented method of claim 1, wherein the feature comprises a classification of the individual user based on the attribute.

5. The computer-implemented method of claim 1, wherein the feature of the individual user is determined by a third party.

6. The computer-implemented method of claim 1, embodied in a cloud-computing environment.

7. The computer-implemented method of claim 1, wherein the new demographic attributes are not preset and are expanded using the crowdsourced approach for each new demographic attribute.

8. A computer program product for linguistic profiling, the computer program product comprising a computer-readable storage medium having program instructions embodied therewith, the program instructions executable by a computer to cause the computer to perform:
    capturing a language input of an individual user;
    analyzing the language input to detect an attribute of the language input by using a machine learning technique based on errors and a gender attribute that is detected by pronoun frequency;
    synthesizing the attribute to characterize a feature of the individual user; and
    combining a plurality of synthesized features to create a combined feature profile of the individual user as a one-to-one profile for only the individual user,
    wherein the attribute and the feature are dynamically detected and are not pre-set via the analyzing and synthesizing,
    wherein a crowdsourced approach is utilized for compiling a plurality of new demographic attributes based on a text analysis of the language input of the individual user and the plurality of synthesized features,
    wherein a group view profile is created from a plurality of combined feature profiles aggregated from linked individual users to categorize a group of individuals,
    wherein a media source comprises the group of individuals,
    the method further comprising:
        outputting the combined feature profile to a third-party application;
        outputting the group view profile to a third-party application to generate a report for a group view of the linked individual users; and
        identifying a world view within the media source,
    wherein the analyzing includes at least two analysis techniques that work in parallel to each output the attribute with a confidence level to the synthesizing, and
    wherein the synthesizing characterizes the attribute to the feature based on the confidence level.

9. The computer program product of claim 8, wherein the language input is selected from a group consisting of:
    spoken text;
    sign language
    written text; and
    inferred speech.

10. The computer program product of claim 8, wherein the attribute is based on an individual, user-specific identifying feature of the user.

11. The computer program product of claim 8, wherein the feature comprises a classification of the individual user based on the attribute.

12. A linguistic profiling system, said system comprising:
a processor; and
a memory, the memory storing instructions to cause the processor to perform:
  capturing a language input of an individual user;
  analyzing the language input to detect an attribute of the language input by using a machine learning technique based on errors and a gender attribute that is detected by pronoun frequency;
  synthesizing the attribute to characterize a feature of the individual user; and
  combining a plurality of synthesized features to create a combined feature profile of the individual user as a one-to-one profile for only the individual user,
wherein the attribute and the feature are dynamically detected and are not pre-set via the analyzing and synthesizing,
wherein a crowdsourced approach is utilized for compiling a plurality of new demographic attributes based on a text analysis of the language input of the individual user and the plurality of synthesized features,
wherein a group view profile is created from a plurality of combined feature profiles aggregated from linked individual users to categorize a group of individuals,
wherein a media source comprises the group of individuals,
the method further comprising:
  outputting the combined feature profile to a third-party application;
  outputting the group view profile to a third-party application to generate a report for a group view of the linked individual users; and
  identifying a world view within the media source,
wherein the analyzing includes at least two analysis techniques that work in parallel to each output the attribute with a confidence level to the synthesizing, and
wherein the synthesizing characterizes the attribute to the feature based on the confidence level.

13. The system of claim 12, wherein the language input is selected from a group consisting of:
  spoken text;
  written text; and
  inferred speech.

14. The system of claim 12, wherein the attribute is based on an individual, user-specific identifying feature of the user.

15. The system of claim 12, embodied in a cloud-computing environment.

16. A computer-implemented linguistic profiling method, the method comprising:
  capturing a language input of an individual user;
  analyzing the language input to detect an attribute of the language input and profile the language input by using a machine learning technique based on errors and a gender attribute that is detected by pronoun frequency;
  synthesizing the attribute to characterize a feature of the individual user by combining different values for each attribute, based on a confidence level; and
  combining a plurality of synthesized features to create a combined feature profile of the individual user as a one-to-one profile for only the individual user, the combined feature profile being a profile of each of the features of the user deducted from the attributes from the language input,
wherein a group view profile is created from a plurality of combined feature profiles aggregated from linked individual users to categorize a group of individuals,
wherein the attribute and the feature are dynamically detected and are not pre-set via the analyzing and synthesizing, and
wherein a crowdsourced approach is utilized for compiling a plurality of new demographic attributes based on a text analysis of the language input of the individual user and the plurality of synthesized features,
the method further comprising outputting the group view profile to a third-party application to generate a report for a group view of the linked individual users,
wherein the analyzing includes at least two analysis techniques that work in parallel to each output the attribute with a confidence level to the synthesizing,
wherein the synthesizing characterizes the attribute to the feature based on the confidence level,
wherein a media source comprise the group of individuals,
wherein a world view within the media source is identified.

* * * * *